United States Patent
Yamamoto (10) Patent No.: US 7,116,510 B2
(45) Date of Patent: Oct. 3, 2006

(54) SERVO SELF-WRITE DISK DRIVE WITH DUAL-STAGE ACTUATOR

(75) Inventor: Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 10/673,771

(22) Filed: Sep. 29, 2003

(65) Prior Publication Data

US 2005/0068658 A1 Mar. 31, 2005

(51) Int. Cl.
*G11B 21/02* (2006.01)

(52) U.S. Cl. .................. 360/75; 360/78.05
(58) Field of Classification Search .......... 360/48, 360/75, 77.03, 77.05, 77.08, 77.02, 51, 77.04, 360/52, 78.01, 78.04, 78.05
See application file for complete search history.

(56) References Cited

U.S. PATENT DOCUMENTS

| | | | |
|---|---|---|---|
| 5,936,805 A | 8/1999 | Imaino | |
| 6,040,955 A | 3/2000 | Brown et al. | |
| 6,344,942 B1 * | 2/2002 | Yarmchuk | 360/75 |
| 6,429,989 B1 | 8/2002 | Schultz et al. | |
| 6,493,176 B1 * | 12/2002 | Deng et al. | 360/78.05 |
| 6,519,107 B1 | 2/2003 | Ehrlich et al. | |
| 6,738,215 B1 * | 5/2004 | Yatsu | 360/75 |

* cited by examiner

*Primary Examiner*—Sinh Tran
*Assistant Examiner*—Jason Olson
(74) *Attorney, Agent, or Firm*—Joseph P. Curtin; Darren Gold (57) ABSTRACT

A hard disk drive (HDD) uses a technique for setting the initial servo track pitch for a servo system by using a secondary actuator, such as a microactuator or a milliactuator. The actuator of the HDD is positioned against a crash stop and a burst pattern is written on a hard disk while the read/write head is in a first position. A bias voltage of the secondary actuator is incrementally changed to change the position of the read/write head and a burst pattern is written for each change. The overlap is determined as a sum of the averaged amplitudes of the burst patterns that are adjacent to a selected burst pattern divided by the averaged amplitude of the selected burst pattern. The process is terminated when the determined overlap for each selected burst pattern is within a selected criterion of a target overlap value.

9 Claims, 6 Drawing Sheets

SERVO SELF-WRITE DISK DRIVE WITH DUAL-STAGE ACTUATOR

RELATED APPLICATION

This application is related to concurrently filed co-pending application titled: "METHOD FOR SELF-SERVO WRITING A DISK DRIVE WITH A DUAL-STAGE ACUTATOR".

BACKGROUND OF THE INVENTION

Field of the Invention

The present invention relates to hard disk drives (HDDs). More particularly, the present invention relates to a technique for setting the initial servo track pitch for a Self-Servo Writing (SSW) process.

Description of the Related Art

Figure 1:
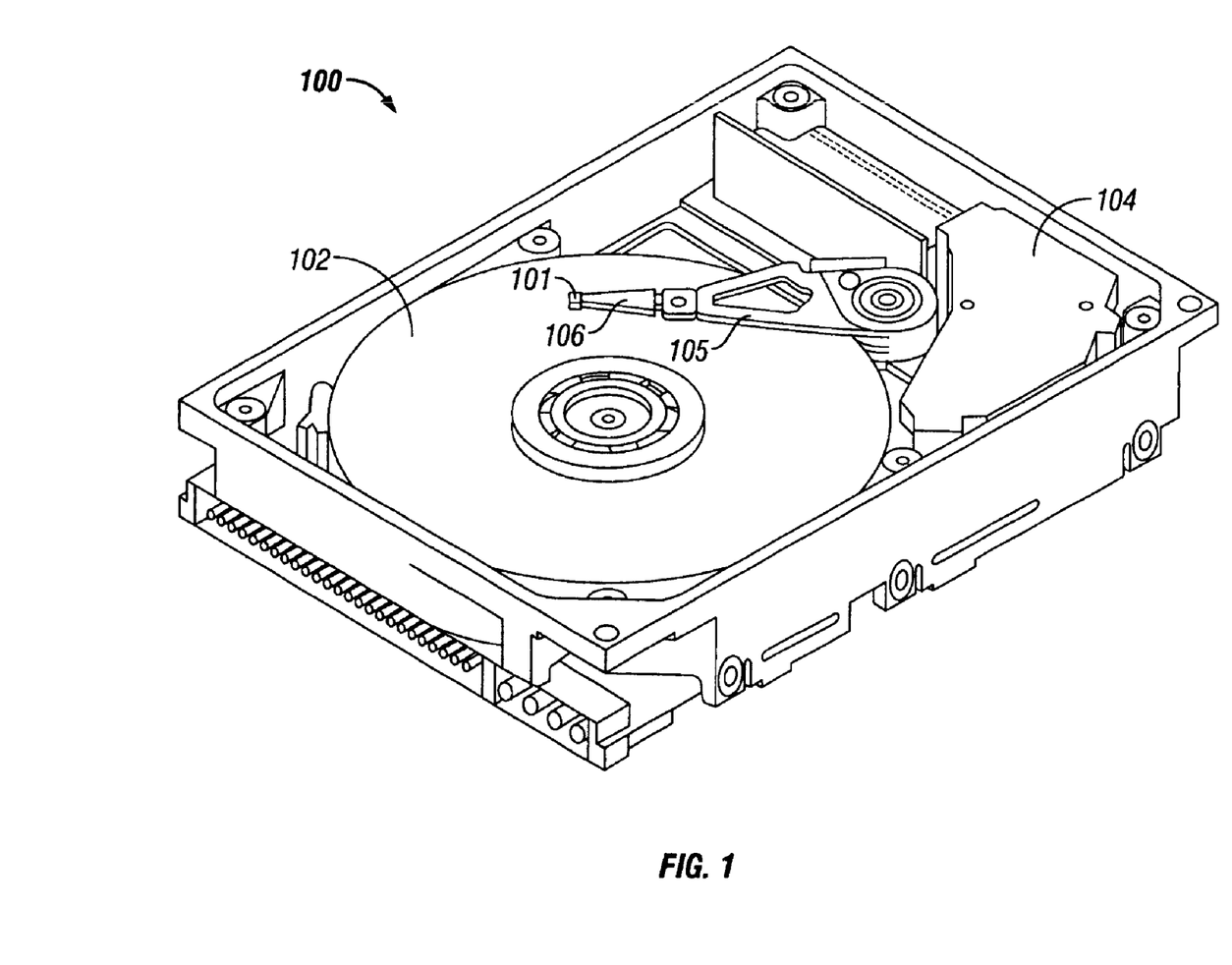
FIG. 1 shows an exemplary hard disk drive (HDD) having a dual-stage servo system.

FIG. 1 shows an exemplary hard disk drive (HDD) 100 having a magnetic read/write head (or a recording slider) 101 that includes, for example, an offset head, that is positioned over a selected track on a magnetic disk 102 using a dual-stage servo system for writing data to and/or reading data from disk 102. Data is recorded in arrays of concentric data information tracks on the surface of disk 102. While HDD 100 shows only a single magnetic disk 102, HDDs typically have a plurality of stacked, commonly rotated rigid magnetic disks.

The dual-stage servo system of HDD 100 includes an actuator 105, a voice-coil motor (VCM) 104, for coarse positioning a read/write head suspension 106, and a secondary actuator, such as a microactuator or micropositioner, for fine positioning read/write head 101 over a selected track. As used herein, a microactuator (or a micropositioner) is a small actuator that is placed between a suspension and a slider and moves the slider relative to the suspension.

Figure 2:
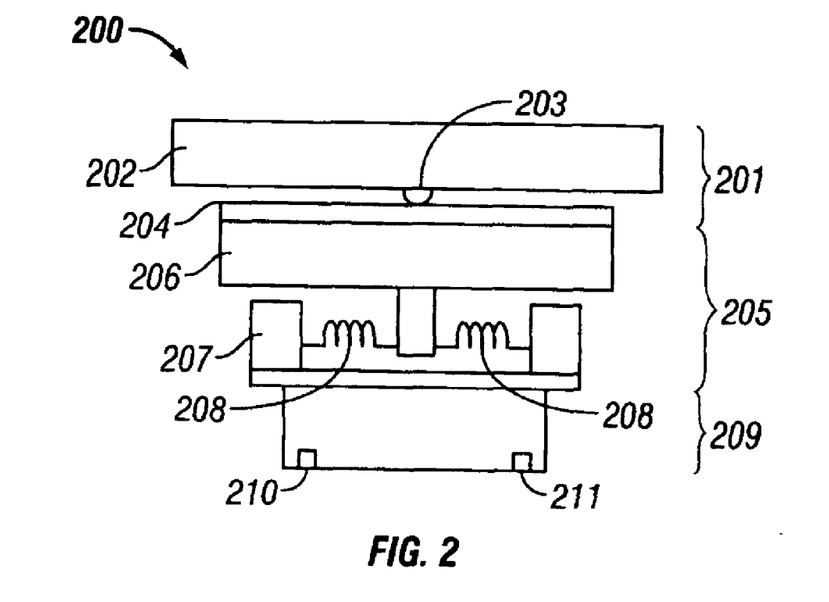
FIG. 2 depicts a cross-section of an exemplary suspension and microactuator arrangement.

FIG. 2 depicts a cross-section of an exemplary suspension and microactuator arrangement 200 that includes a suspension 201, a microactuator 205 and a slider 209. Suspension 201 includes a load beam 202, a dimple 203 and a flexure 204. Microactuator 205 includes a substrate 206, a microactuator structure 207 and at least one flexure element 208. Substrate 206 is the stationary structure of microactuator 205. Microactuator structure 207 is the movable structure of microactuator 205. Slider 209 includes a read element 210 and a write element 211 that is offset from read element 201.

Track accessing and following is typically provided by a servo system of an HDD by using magnetically written patterns, referred to as servo patterns, that are stored on at least one magnetic disk of an HDD. One common type of servo pattern arrangement that is used is referred to as a dedicated servo system in which one surface of one of the hard disks is used for storing all the servo patterns. Another common type of servo pattern arrangement that is used is referred to as a sector servo system in which a small portion of a track between each sector or between several sectors on each track on each data surface is used for storing the servo patterns. Yet another common type of servo pattern arrangement that is used is referred to as a hybrid servo system in which both dedicated and servo-sector type servo system techniques are used, thereby obtaining advantages of each respective type of servo system.

One technique that is used for writing servo patterns on the disk or disks of an HDD uses special equipment referred to as a servo writer system. A servo writer system includes, for example, a laser-measured access system for accurately positioning the heads of the servo writer system over the disks of the HDD for accurately writing the servo patterns. The HDD is clamped to a servo writer in order to maintain accurate positioning between the HDD and the servo writer. U.S. Pat. No. 6,519,107 B1 to Ehrlich et al. discloses an exemplary a technique for writing servo patterns onto a magnetic hard disk drive.

One drawback of using a servo writer system is that it must be used in a clean environment in order to reduce the probability of contamination of the HDD because the HDD is open during the servo pattern writing process. Additionally, the resonances of the HDD change when the HDD is unclamped from the servo writer. Consequently, the servo system of the HDD does not perfectly follow the servo patterns, resulting in repeatable runout that makes determination of being on-track difficult by the servo system.

Self-servo writing (SSW) techniques have been developed for reducing the drawbacks associated writing servo patterns using a servo writer. For example, U.S. Pat. No. 6,040,955 to Brown et al. relates to a self-servo writing (SSW) technique in which servo information is written on a magnetic disk starting at a first crash stop of an HDD. The head writing the servo information is moved toward the other crash stop until the detected amplitude of the just-written servo information equals a predetermined amount, at which point more servo information is written. Movement of the head and writing of the next servo pattern continues across the disk until the second crash stop is encountered. U.S. Pat. No. 6,429,989 B1 to Shultz et al. relates to an SSW technique that writes timing marks across the surface of a magnetic disk based on detecting both the passage of the timing marks and writing radial extensions to timing marks at substantially the same circumferential positions.

Figure 3:
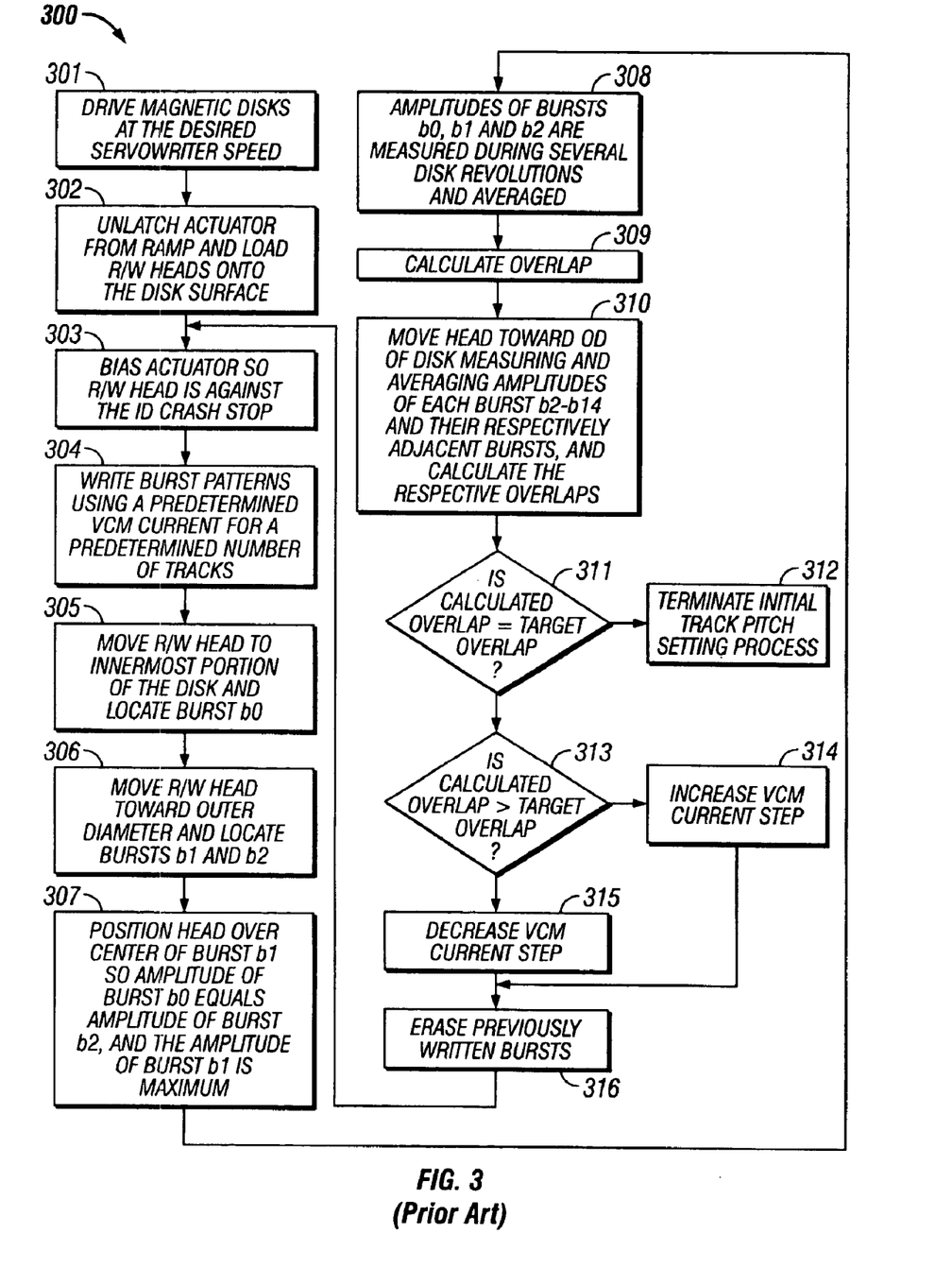
FIG. 3 shows a flowchart for an exemplary initial servo track-pitch-setting technique that is performed at the beginning of a conventional SSW process.

One aspect of an SSW process is that the initial servo track pitch is set at the beginning of the SSW process. The compliance of the Inner Diameter (ID) crash stop and a predetermined amount of VCM current are used for producing a set of equally spaced tracks in a radial direction that are used as the basis for the radial propagation across the entire surface of the disk during the next phase of the SSW process. FIG. 3 shows a flowchart 300 for an exemplary conventional initial servo track-pitch-setting technique that is performed at the beginning of a conventional SSW process. At step 301, the motor driving the magnetic disks of the HDD is driven at the desired servowriter speed. At step 302, the actuator is unlatched from the ramp and the read/write heads are loaded onto the disk surface at a controlled speed. At step 303, the actuator is biased so that the read/write head is against the ID crash stop and the actuator is made ready for the SSW process. At step 304, burst patterns are written using a predetermined VCM current for a predetermined number of tracks, such as 16 tracks. Usually, 100–200 bursts are written per one disk revolution. For example, if the track has 200 sectors (sectors 0–199), a burst in written in each of sectors 0–199. The burst write timing and the VCM current are changed for each servo track.

Figure 4:
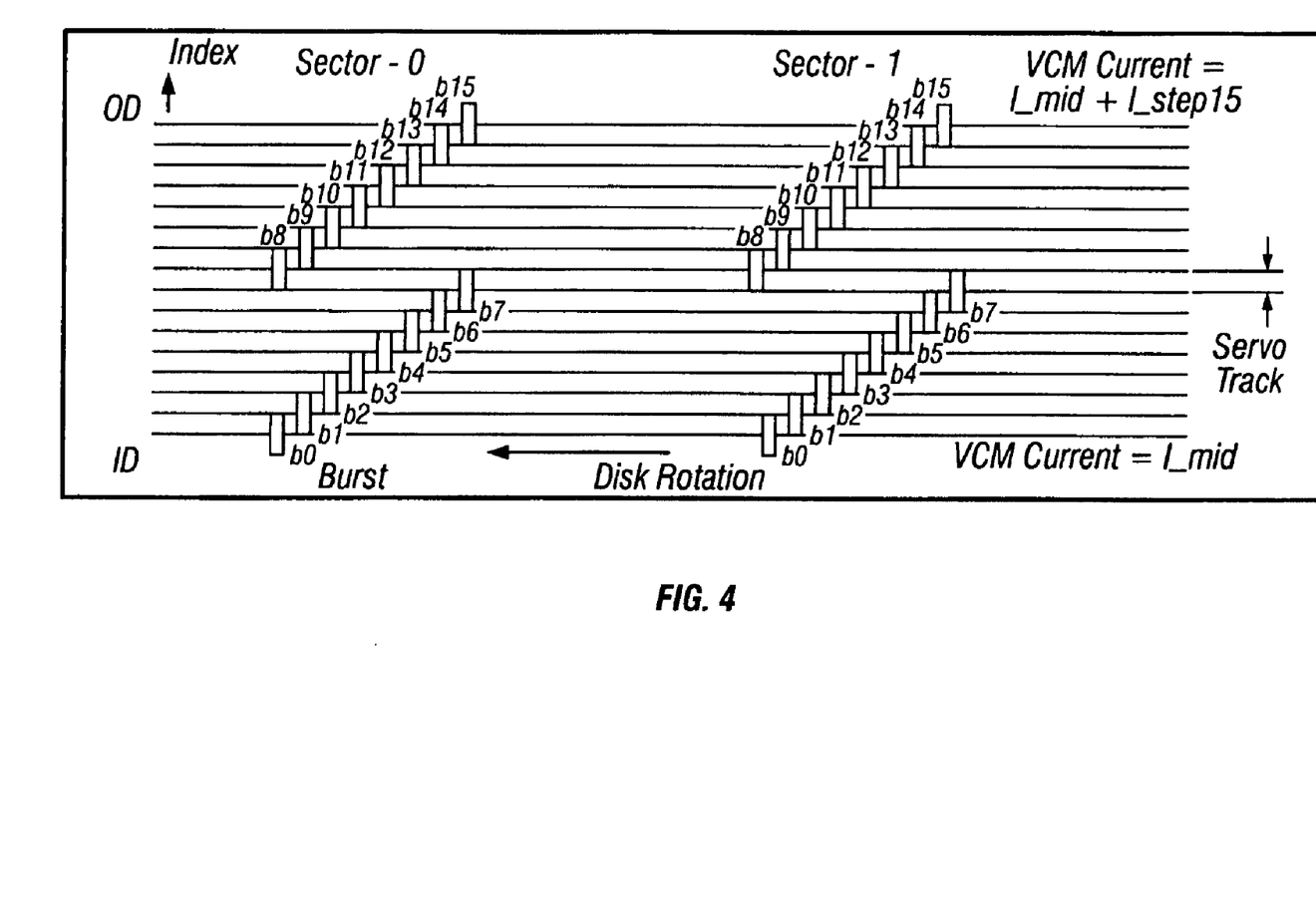
FIG. 4 depicts the result of the exemplary servo initial track-pitch-setting technique shown in FIG. 3 after bursts are written for 16 tracks.

FIG. 4 depicts the result of the exemplary servo initial track-pitch-setting technique shown in FIG. 3 after bursts are written for 16 tracks. FIG. 4 shows 16 servo tracks of two sectors, sectors 0 and 1. The lower portion of FIG. 4 is at the ID of the disk and the upper portion is toward the OD of the disk. Bursts b0–b15 have been written in each sector 0 and 1. Disk rotation is from right to left.

After the burst pattern has been written, the head is moved toward the innermost portion of the disk at step 305 and burst b0, i.e., the burst pattern located closest to the ID of the disk, is located using the read sensor of the read/write head.

At step 306, the read/write head is moved toward outer diameter using very small steps of VCM current and bursts b1 and b2 are located. At step 307, the read sensor portion of the head is positioned over the center of burst b1 so that the amplitude of burst b0 equals the amplitude of burst b2 and the amplitude of burst b1 is a maximum. At step 308, the respective amplitudes of bursts b0, b1 and b2 are measured during several disk revolutions and averaged.

At step 309, the overlap is calculated, defined as Overlap= (b0+b2)/b1, in which b0, b1 and b2 are the respective averaged amplitudes of bursts b0, b1 and b2. At step 310, the head is moved toward the OD of the disk measuring and averaging the amplitudes of each burst b2-b14 and their respectively adjacent bursts, and calculating the overlap similar to the overlap calculation defined in step 309. For each measurement in step 310, the read sensor portion of the head is positioned over the center of the burst for which the overlap measurement is being made (i.e., the center of each burst b2-b14), so that the amplitudes of the bursts that are adjacent to the burst being measures are equal and the amplitude of the burst being measured is a maximum. At step 311, the calculated overlaps are compared to a target overlap value, such as 0.9. If, at step 311, the difference between the calculated overlaps and the target overlap value is within a selected criterion, such as 2%, the flow continues to step 312 and the initial track-pitch-setting technique is terminated.

If, at step 312, the calculated overlap is not within the selected criterion of the target overlap value, then flow continues to step 313 where it is determined whether the calculated overlap is greater than the target overlap value. If, at step 313, the calculated overlap is greater than the target overlap value, flow continues to step 314 where the predetermined VCM current interval is increased an increment. Flow continues to step 315. If, at step 313, the calculated overlap is less than the target overlap value, flow continues to step 316 where the predetermined VCM current overlap is decreased an increment. Flow continues to step 315 where all previously written bursts are erased. Flow continues to step 303 with the new predetermined VCM current and the process is repeated until the calculated overlap is within the selected criterion of the target overlap value.

Figure 5:
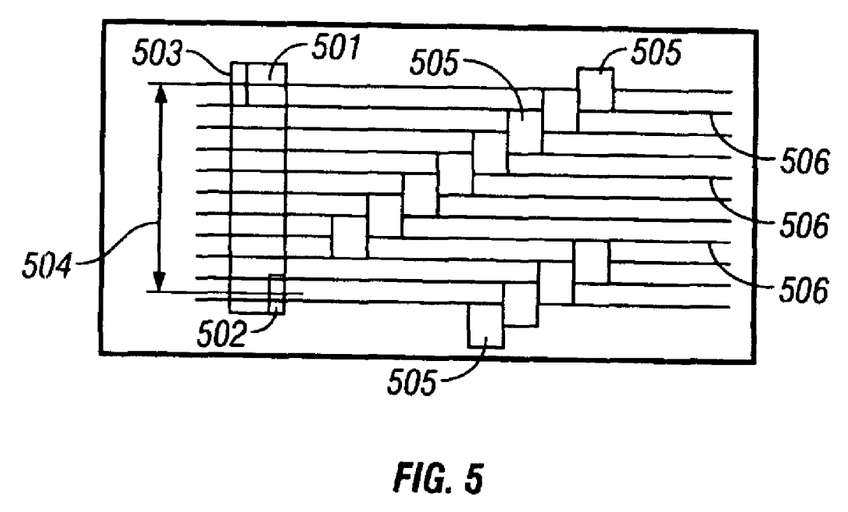
FIG. 5 depicts the read/write offset of an exemplary head.

At the end of initial servo track setting process of FIG. 3, a set of equally spaced tracks in the radial direction (i.e., 16 tracks having a few hundreds of burst patterns) have been created. The patterns are located at inner diameter portion of the disk. A conventional SSW uses the initial track-pitch-setting technique for compensating for a head having a large read/write offset. That is, the edge of the actuator touches the ID crash stop so no servo control is necessary for placing the head at the center of each burst. The number of written tracks must be greater than 2+Read/Write offset of the head in tracks because the read/write offset of the head is much greater than the servo track pitch, as depicted in FIG. 5. In FIG. 5, a head 501 includes read element 502 and write element 503, which are separated by read/write offset 504. Bursts 505 are shown written on servo tracks 506.

Figure 6:
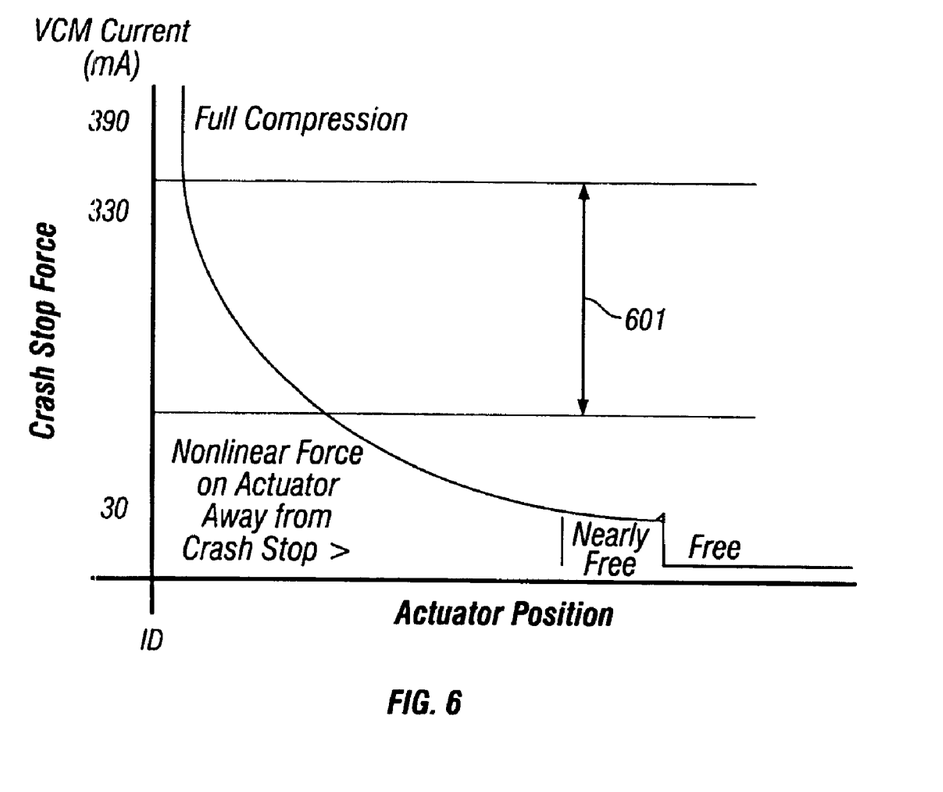
FIG. 6 is a graph depicting the relationship between crash stop force (pushing force) in terms of VCM current as a function of actuator position.

The conventional initial servo-track-pitch-setting technique relies on ID crash stop compliance for providing controllable, open-loop movement of the head. That is, when the actuator is pushed against the ID crash stop, i.e., step 303 in FIG. 3, the ID crash stop is compressed and the position of the head different than if the ID crash stop were not compressed. The position of the head when the ID crash stop is compressed is related to the amount of VCM current that is used for compressing the ID crash stop. FIG. 6 is a graph depicting the relationship between crash stop force (pushing force) in terms of VCM current as a function of actuator position. The VCM current values shown in FIG. 6 are representative and can change depending on the material used for the ID crash stop, the VCM torque constant, the geometry of the ID crash stop and the actuator, and other external forces. As FIG. 6 shows, ID crash stop compression, i.e., the position of the actuator, and the applied force are not linearly related. Typically, the compression range indicated by 601 is used during an initial servo track setting process. The curve of FIG. 6 is not exactly repeatable so head position at the ID crash stop is not exactly repeatable for the same VCM current. As a result, when a conventional initial servo track setting process is repeated, the process takes a lot of time. Further, additional time is required for the position of the head to settle as the head is moved across the disk based on VCM current. Moreover, the remainder of the SSW process is performed using the final predetermined fixed VCM current so the overall processing time and positional accuracy of the servo information can be adversely affected. Accordingly, expensive materials must be used for the ID crash stop because the ID crash stop compliance characteristics are critical for the initial track-pitch-setting technique.

Consequently, what is needed is a technique for setting the initial servo track pitch that does not rely on ID crash stop compliance characteristics as a basis for setting servo track pitch.

BRIEF SUMMARY OF THE INVENTION

The present invention provides a technique for setting the initial servo track pitch that does not rely on ID crash stop compliance characteristics as a basis for setting servo track pitch. Further, the technique of the present invention improves the accuracy of the overall SSW process.

The advantages of the present invention are provided by a method for setting an initial servo track pitch for a servo system of a hard disk drive having at least one hard disk, an actuator, a secondary actuator, such as a microactuator or a milliactuator, a read/write head corresponding each hard disk, and at least one crash stop for the actuator. The actuator is positioned against the crash stop, either an inside diameter crash stop or an outside diameter crash stop, and a burst pattern is written on at least one hard disk while the actuator is positioned against the crash stop and while the read/write head is in a first position. The bias voltage that is applied to the secondary actuator is changed by a predetermined bias voltage increment for a predetermined number of times, such as sixteen times, to change the position of the read/ write head a corresponding number of times and a burst pattern is written on at least one hard disk at each respective changed position of the read/write head. An amount of overlap is determined for at least one selected burst pattern having two burst patterns that are adjacent to the burst pattern. When sixteen burst patterns are written, fourteen burst patterns are typically selected for determining the overlap. The amount of overlap is determined by measuring and averaging the amplitude of a plurality of selected burst patterns, such that each selected burst pattern has two adjacent burst patterns, and by measuring and averaging the amplitude of each burst pattern that is adjacent to each selected burst pattern. The overlap is then determined for each selected burst pattern as a sum of the averaged amplitudes of the burst patterns that are adjacent to the selected burst pattern divided by the averaged amplitude of the selected burst pattern. The method for setting the initial servo track pitch is terminated when the amount of overlap determined for each selected burst pattern is within a selected criterion of a predetermined target overlap value. Otherwise, the predetermined bias voltage increment is increased when the amount of overlap for each selected burst pattern is greater than the predetermined target overlap value, or decreased when the amount of overlap for each selected burst pattern is less than the predetermined target overlap value. The process is repeated with the new predetermined bias voltage increment.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides a technique for setting the initial servo track pitch for a dual servo system HDD that does not rely on ID crash stop compliance characteristics as a basis for setting servo track pitch. The present invention uses a secondary actuator for setting the initial servo track pitch setting. While any type of secondary actuator, such as a microactuator or a milliactuator, can be used with the initial servo track pitch setting technique of the present invention, the following description of the present invention is based on use of a microactuator.

The present invention utilizes the stroke of a microactuator for setting the initial servo track pitch. A single predetermined fixed VCM current is used for pushing the actuator against ID crash stop, and the VCM current remains the same during the SSW process. Several different microactuator bias voltages, for example, 16, are used for positioning the head for the write/read process of the initial servo track pitch setting operation, and an erase operation, if necessary.

Currently available microactuators have a stroke of approximately ±1 μm for a ±30 V bias voltage. The relationship between the stroke and the input bias voltage is linear and has excellent repeatability. Currently available HDDs have approximately 100K TPI with a track pitch for a data track that is equal to 0.25 μm. Thus, the stroke of a currently available microactuator covers eight data tracks, i.e., 2 μm/0.25 μm=8). In a conventional SSW process, the servo track pitch is a half of the data track pitch. Accordingly, a microactuator stroke covers 16 servo tracks. Further, the typical read/write offset of a head for a currently available HDD is between 3 to 8 servo tracks. Thus, currently available microactuators can be used for an SSW process according to the present invention for currently available HDDs. Moreover, the stroke of a microactuator can be expanded beyond 16 servo tracks by increasing the range of the bias voltage that is applied to the microactuator. Thus, as the TPI capability of HDDs increases and the track pitch become accordingly narrower, microactuators will have sufficient performance to provide an initial servo track setting operation for an SSW process according to the present invention.

The linear relationship between a microactuator stroke and bias voltage utilized by the present invention makes it easy to calculate the predetermined fixed bias voltage for the next step. Additionally, the time required for head settling is very short so overall SSW processing time is reduced accordingly. Further, the stoke of a microactuator has excellent repeatability as a function of bias voltage, so processing becomes more accurate and can be done in an overall shorter period of time. Further still, ID crash stop compliance characteristics are not as important for the present invention so cheaper materials can be selected for the ID crash stop.

Figure 7:
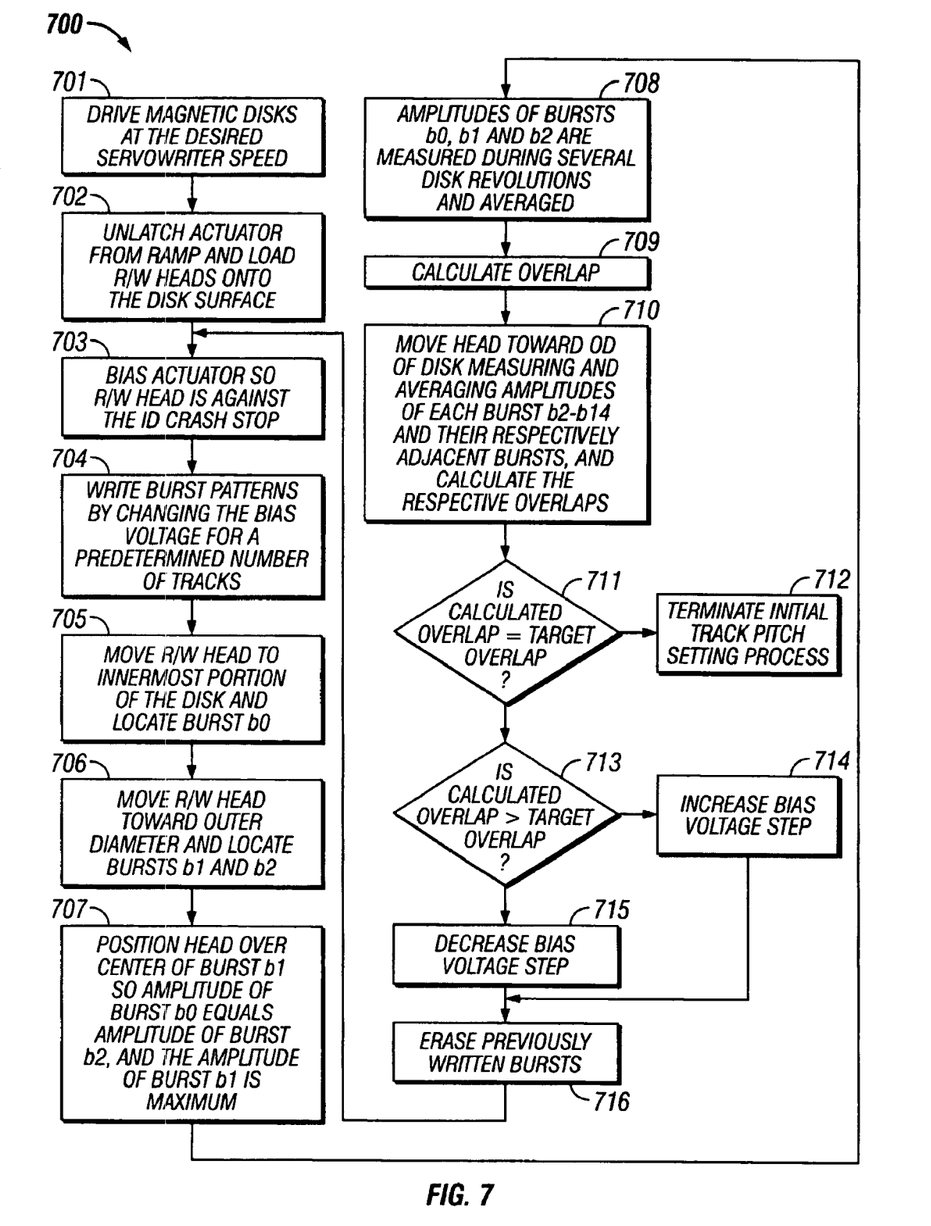
FIG. 7 shows a flowchart for an exemplary initial track-pitch-setting technique according to the present that is performed at the beginning of an SSW process.

FIG. 7 shows a flowchart 700 for an exemplary initial track-pitch-setting technique according to the present that is performed at the beginning of an SSW process. At step 701, the motor driving the magnetic disks of the HDD is driven at the desired servowriter speed. At step 702, the actuator is unlatched from the ramp and the read/write heads are loaded onto the disk surface at a controlled speed. At step 703, a predetermined VCM current is used to bias the actuator against the ID crash stop and made ready for the SSW process. The same predetermined VCM current used for biasing the actuator against the ID crash stop is used throughout the SSW process. At step 704, burst patterns are written using a predetermined bias voltage applied to the microactuator. Usually, 100–200 bursts are written per one disk revolution. For example, if the track has 200 sectors (sectors 0–199), a burst in written in each of sectors 0–199. The burst write timing and the VCM current are changed for each servo track. The result of step 704 appears similar to the results of the conventional initial track setting technique, which is shown in FIG. 4.

After the burst pattern has been written, the head is moved toward the innermost portion of the disk at step 705 by changing the bias voltage applied to the microactuator, and burst b0, i.e., the burst pattern located closest to the ID of the disk, is located using the read sensor of the read/write head. At step 706, the read/write head is moved toward outer diameter by changes in the microactuator bias voltage to locate bursts b1 and b2. At step 707, the read sensor portion of the head is positioned over the center of burst b1 so that the amplitude of burst b0 equals the amplitude of burst b2 and the amplitude of burst b1 is a maximum. At step 708, the respective amplitudes of bursts b0, b1 and b2 are measured during several disk revolutions and averaged.

At step 709, the overlap is calculated, defined as Overlap= (b0+b2)/b1, in which b0, b1 and b2 are the respective averaged amplitudes of bursts b0, b1 and b2. At step 710, the head is moved toward the OD of the disk by changing the bias voltage applied to the microactuator, measuring and averaging the amplitudes of each burst b2–b14 and their respectively adjacent bursts are measured and averaged. For each measurement in step 310, the read sensor portion of the head is positioned over the center of the burst for which the overlap measurement is being made (i.e., the center of each burst b2–b14), so that the amplitudes of the bursts that are adjacent to the burst being measures are equal and the amplitude of the burst being measured is a maximum. The overlap is calculated for each burst b2–14, similar to calculation for overlap in step 709. At step 711, the calculated overlaps are compared to a target overlap value, such as 0.9. If, at step 711, the difference between the calculated overlaps and the target overlap value is within a selected criterion, such as 2%, the flow continues to step 712 and the initial track-pitch-setting technique is terminated.

If, at step 711, the calculated overlap is not within the selected criterion of the target overlap value, then flow continues to step 713 where it is determined whether the calculated overlap is greater than the target overlap value. If, at step 713, the calculated overlap is greater than the target overlap value, flow continues to step 714 where the predetermined bias voltage increment applied to the microactuator is increased a predetermined amount. Flow continues to step 716. If, at step 713, the calculated overlap is less than the target overlap value, flow continues to step 715 the predetermined bias voltage increment applied to the microactuator is decreased a predetermined amount. Flow continues to step 716 where all previously written bursts are erased. Flow continues to step 703 with the new bias voltage step and the process is repeated until the calculated overlap is within the selected criterion of the target overlap value.

While technique of setting the initial servo track pitch by initially positioning the actuator of the HDD against the ID crash stop, it should be understood that the technique of the present invention can also be used by initially positioning the actuator against the OD crash stop.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A hard disk drive, comprising:
   at least one hard disk;
   an actuator;
   a secondary actuator,
   a read/write head corresponding each hard disk; and
   at least one crash stop for the actuator
   at least one hard disk having a servo track pitch that is set by (a) positioning the actuator against the crash stop, (b) writing a burst pattern on at least one hard disk while the actuator is positioned against the crash stop and the read/write head is in a first position, (c) changing a bias voltage applied to the secondary actuator by a predetermined bias voltage increment for a predetermined number of times to change the position of the read/write head a corresponding number of times and writing a burst pattern on at least one hard disk at each respective changed position of the read/write head, (d) determining an amount of overlap for at least one selected burst pattern having two burst patterns that are adjacent to the burst pattern, (e) terminating the method for setting the initial servo track pitch when the amount of overlap determined for each selected burst pattern is within a selected criterion of a predetermined target overlap value; (f) increasing the predetermined bias voltage increment when the amount of overlap for each selected burst pattern is greater than the predetermined target overlap value, and decreasing the predetermined bias voltage increment when the amount of overlap for each selected burst pattern is less than the predetermined target overlap value, and (g) repeating steps (a) through (e) with the new predetermined bias voltage increment.

2. The hard disk drive according to claim 1, wherein when the amount of overlap is determined for each selected burst pattern, an amplitude of a plurality of selected burst patterns is measured, each selected burst pattern having two adjacent burst patterns, an amplitude of each burst pattern that is adjacent to each selected burst pattern is measured, and the overlap is determined for each selected burst pattern as a sum of the amplitudes of the burst patterns that are adjacent to the selected burst pattern divided by the amplitude of the selected burst pattern.

3. The hard disk drive according to claim 2, wherein when the amplitude of the plurality of selected burst patterns is measured and when the amplitude of each burst pattern are each performed a predetermined number of times is measured, the measured amplitudes of each respective selected burst pattern are averaged, the measured amplitudes of each burst pattern that is adjacent to each respective burst pattern is averaged, and the overlap for each respective selected burst pattern is determined is based on the averaged measured amplitudes of each respective burst pattern.

4. The hard disk drive according to claim 1, wherein the predetermined number of times the position of the read/write head is changed is sixteen.

5. The hard disk drive according to claim 4, wherein the overlap is determined for fourteen burst patterns.

6. The hard disk drive according to claim 1, wherein the crash stop is an inside diameter crash stop.

7. The hard disk drive according to claim 1, wherein the crash stop is an outside diameter crash stop.

8. The hard disk drive according to claim 1, wherein the secondary actuator is a microactuator.

9. The hard disk drive according to claim 1, wherein the secondary actuator is a milliactuator.

* * * * *